United States Patent
Hsu et al.

(10) Patent No.: US 6,955,697 B1
(45) Date of Patent: Oct. 18, 2005

(54) AIR CLEANER FOR ENGINES

(75) Inventors: Wen Yuan Hsu, Kaohsiung (TW); San Chi Lee, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 10/815,784

(22) Filed: Apr. 2, 2004

(51) Int. Cl.[7] .............................................. B01D 50/00
(52) U.S. Cl. .................... 55/385.1; 55/385.3; 180/68.1; 180/68.3; 180/69.01; 123/198 E
(58) Field of Search ........................... 55/385.1, 385.3; 180/68.3, 68.1, 69.01; 123/198 E

(56) References Cited

U.S. PATENT DOCUMENTS

| | | | |
|---|---|---|---|
| 2,853,153 A * | 9/1958 | Sexton ........................... 96/31 |
| 3,737,002 A * | 6/1973 | Yotsumoto .................. 180/68.3 |
| 4,198,217 A * | 4/1980 | Erdmannsdorfer ......... 55/385.5 |
| 4,917,202 A * | 4/1990 | Glover et al. .............. 180/68.3 |

* cited by examiner

Primary Examiner—Duane Smith
Assistant Examiner—Minh-Chau T. Pham
(74) Attorney, Agent, or Firm—Leong C. Lei

(57) ABSTRACT

An air cleaner for engines includes a fender provided on the side of the air inlet and the air passage, and a hollow tube adapted to the air inlet to prevent weeds, dust, and pebbles from entering into the air cleaner for enabling clean air to be delivered to the engine continuously and protecting the carburetor from being contaminated by foreign matter.

2 Claims, 6 Drawing Sheets

AIR CLEANER FOR ENGINES

BACKGROUND OF THE INVENTION (a) Technical Field of the Invention

The present invention is related to an air cleaner for an engine adapted to a power mower, and more particularly, to one that prevents foreign matter such as weeds, dust, and pebbles from being sucked into the air cleaner to enable clean air to be fed to the engine continuously and prevent the foreign matter from contaminating the carburetor of the engine.

(b) Description of the Prior Art

The air cleaner for engines adapted to power mowers generally available in the market functions to introduce fresh air to be mixed with fuel for combustion and explosion in the engine to generate power. As illustrated in FIGS. 1 and 2 of the accompanying drawings, the power mower 1 is essentially comprised of a body 11, two front wheels 12, two rear wheels 13, an engine 14, a fuel tank 15 and a handle 16. Wherein, a cutting cylinder (not illustrated) is provided at the bottom of the body 11; both pairs of front wheels 12 and rear wheels 13 are respectively provided in the front and the rear of the body 11; the engine 14 and the fuel tank 15 are mounted on the top of the body 11; the handle 16 extends upwards from the rear of the body 11; a speed controller 151 is provided to the handle 16; and a conductor 152 is used to connect the speed controller 16 to the engine 14. Once the power mower operates, the fresh air is introduced through an air cleaner 2 into a carburetor 3 to mix with the fuel. The mixture is then imported into the engine 14 for combustion and explosion to create power to drive the cutting cylinder to revolve with the speed to be controlled by the speed controller 151, thus for the user to steer the handle 16 for mowing.

Referring to FIGS. 2 and 3, the air cleaner 2 includes a case 21, an air cleaner element 22 and a cover 23. Wherein, on one side of the case 21 which is closer to the carburetor 3 is provided with an air inlet 211, and a supplementary air inlet 212. In addition to admitting the air, the supplementary air inlet 212 also functions as a drain. A locking member 213 in a long oval shape extends upwards from the center of the case 21. An air outlet 214 is provided on the bottom of the locking member 213 and two locking posts 215 are each provided on both sides inside the locking member 213. The locking post 215 relates to a hollow pillar and is internally threaded. Furthermore, an air passage 216 connecting through the carburetor 3 is disposed below the case 21.

The air cleaner element 22 has a hollow center at its bottom for the insertions of the locking member 213 and both locking pillars 215 from the case 21. A trap 221 in the form of a piece of filtration cotton or paper is provided to the peripheral of the air cleaner element 22. A resilient washer 222 is provided on the lower circumference of the air cleaner element 22, and a locking hole 223 is disposed above the air cleaner element 22 at where in relation to the location of the locking pillar 215.

The cover 23 is a rectangular shape to cover up the case 21 and a through hole 231 is provided on top of the cover 23 in relation to the location of the locking pillar 215 to permit insertion of a fastener 24 for locking purposes.

As illustrated in FIG. 3 for the assembly of the air cleaner 2 of the prior art, the air cleaner element 22 is placed on the locking member 213 inside the case 21 with the locking holes 223 on the air cleaner element 22 located in relation to the locking post 215 and the resilient washer 222 below the air cleaner element 22 flushed to the case to prevent overflow of clean air. The cover 23 is then placed upon the case with the through hole 231 on top of the cover 23 located in relation to the locking hole 223 of the air cleaner element 22. The fastener 24 is inserted through the locking hole 223 of the air cleaner element 22 via the through hole 231 and locked to the locking post 215.

When the engine 14 is operating as illustrated in FIGS. 1 and 3, the ambient air enters into the case 21 through the air inlet 211 and the supplementary air inlet 212. Vapor and foreign matter carried by the air are filtered with the trap 221 for the vapors to condensate into drops to be drained out of the case 21 through the supplementary air inlet 212. As illustrated in FIGS. 1 and 2, the clean air passing through the trap 221 enters into the air passage 216 through the air outlet 214 to mix with the fuel by the carburetor 3 for keeping the engine 14 running.

However, foreign matter including weeds, dust and pebbles are usually present in the air fed to the power mower in operation. When the air around the air cleaner 2 enters into the case 21 through the air inlet 211 and the supplementary air inlet 212, the foreign matter will be usually sucked into the case 21 at the same time, and weeds and dust of a smaller size may pass through the air inlet 211 and the supplementary air inlet 212 may be intercepted by the trap 221; but larger sized matter may block the air inlet 211 resulting in a higher concentration of air-fuel mixture to discharge the higher volume of exhaust. Furthermore, it requires the user to remove the air cleaner 2 for cleaning. In serious cases, the engine will fail and the foreign matter will contaminate the carburetor 3.

As described above, the air inlet 211 is vulnerable to being blocked by weeds and dust resulting in an insufficient supply of fresh air to the carburetor 3 to discharge higher volume of exhaust. Frequent maintenance of the air filter also presents an inconvenience for the user.

SUMMARY OF THE INVENTION

The primary purpose of the present invention is to provide an engine air cleaner for a power mower to supply clean air continuously to the carburetor and prevent weeds, dust, and pebbles from being sucked into the air cleaner and thereby contaminating the carburetor. To achieve this purpose, a fender is provided on the side of the air inlet and air passage of the air cleaner to prevent weeds, dust, and chisels from being sucked into the air filter.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
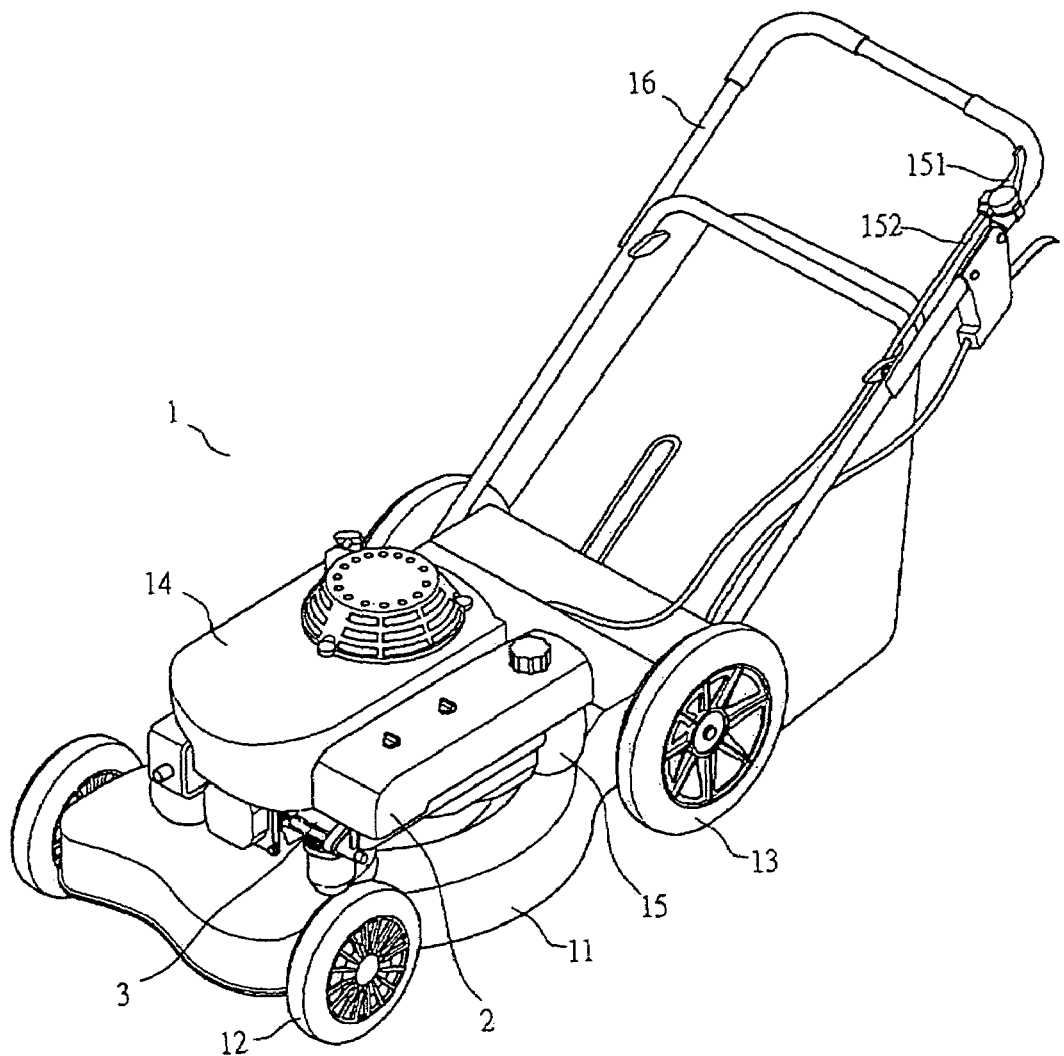
FIG. 1 is a perspective view of a power mower of the prior art.
Figure 2:
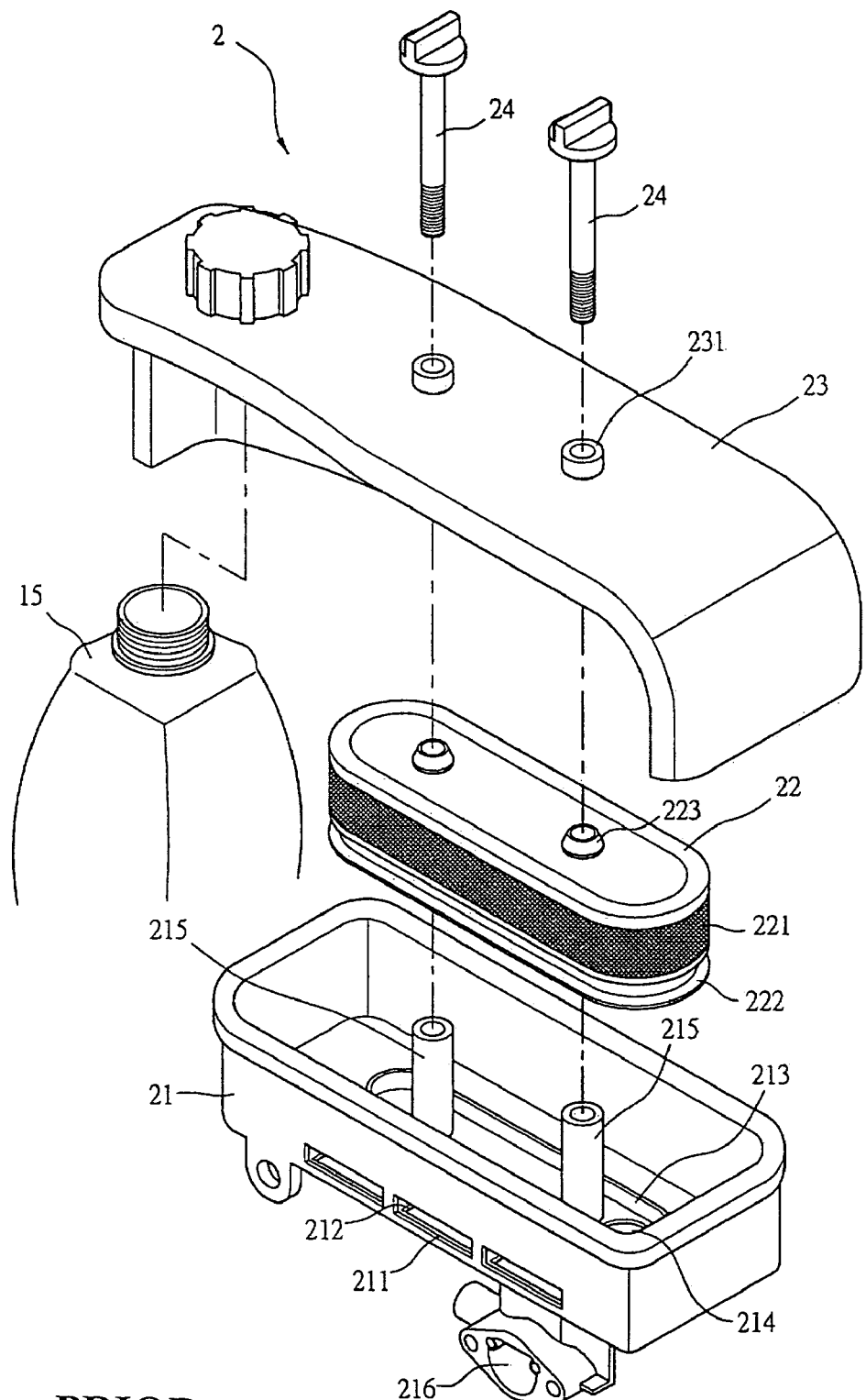
FIG. 2 is an exploded view of an air cleaner used in an engine of the power mower of the prior art.
Figure 3:
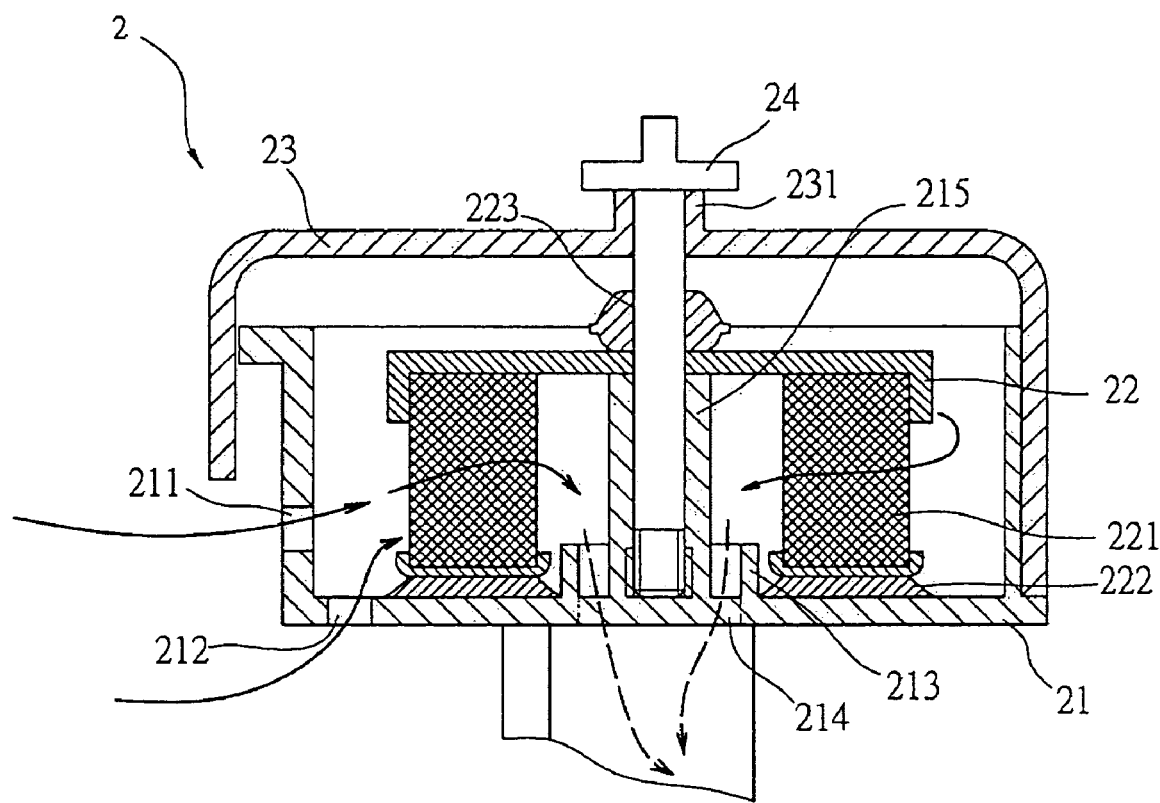
FIG. 3 is a sectional view showing a local part of the air cleaner of the prior art.
Figure 4:
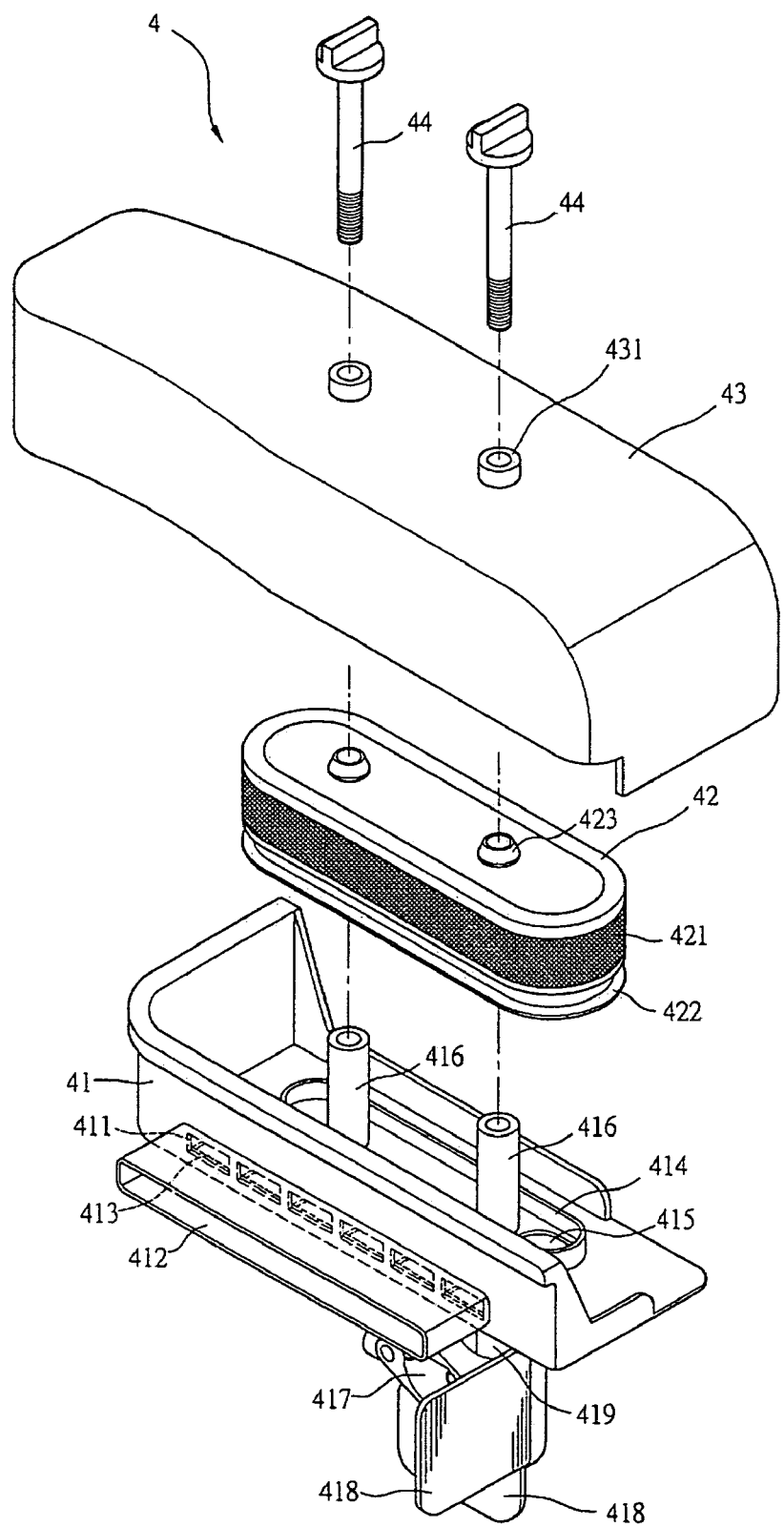
FIG. 4 is an exploded view of an air cleaner of the present invention.
Figure 6:
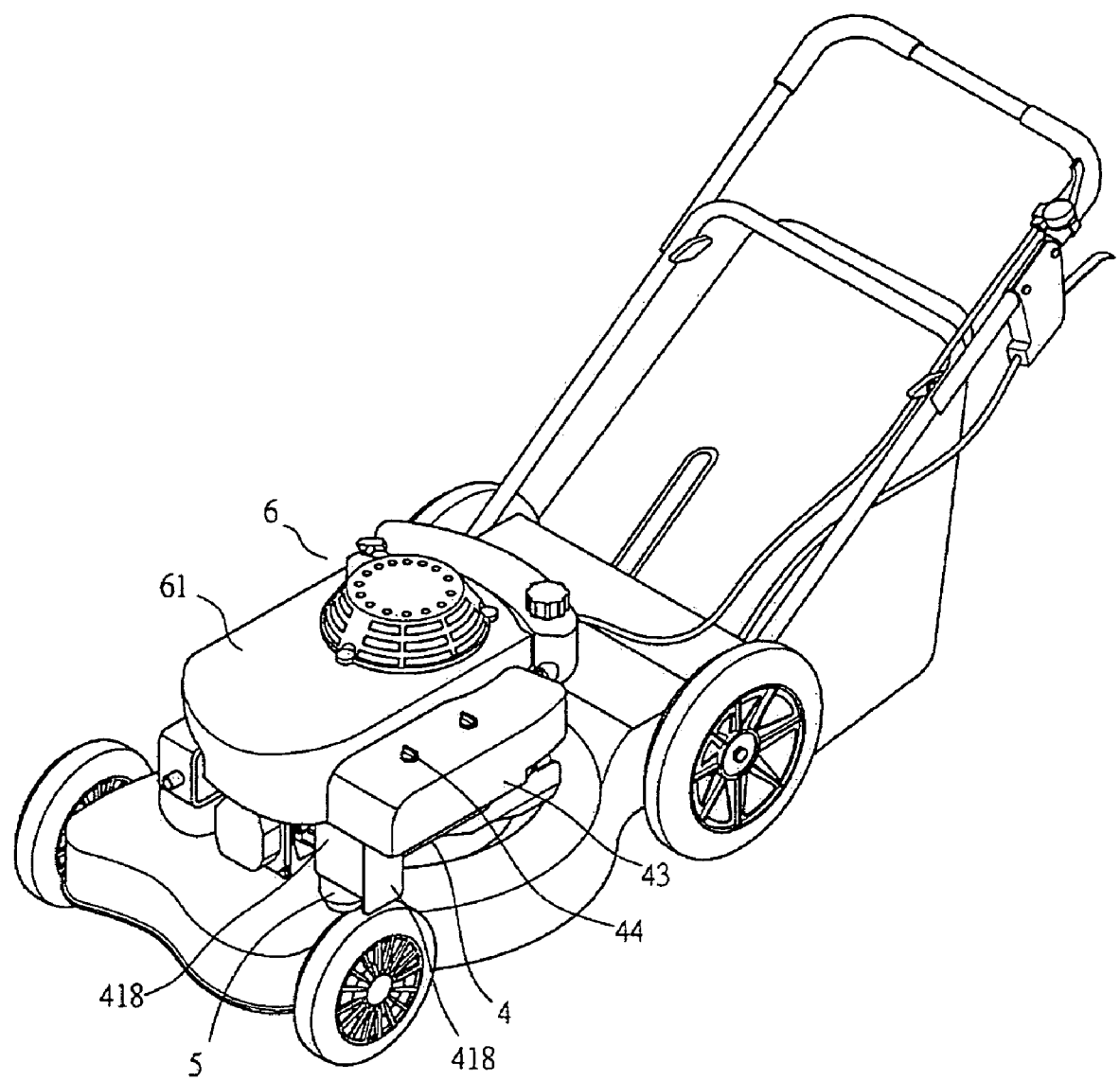
FIG. 6 is a perspective view showing the present invention adapted to a power mower.

Referring to FIGS. 4 and 6, an air cleaner 4 adapted to an engine 61 is essentially comprised of a case 41, an air cleaner element 42 and a cover 43. The case 41 and the cover 43 define a space to accommodate the air cleaner element 42. An air inlet 411 is provided on the side at where close to a carburetor 5. A hollow tube 412 extends externally from the peripheral of the case 41. A supplementary air inlet 413 is provided at the bottom of the case 41 to admit air and to function as a drain. A long oval locking member 414 extending upward from the center of the case 41 has at its bottom disposed with an air outlet 415 and two hollow locking posts 416 each internally threaded respectively provided on both sides of the locking member 414. An air passage 417 is connecting through a carburetor 5 is provided below the case 41. The air passage relates to a hollow tube 419 integrated with the case 41 at its below, and a fender to screen the case 41 is provided by the air passage 417 below the case 41.

The air cleaner element 42 has a hollow center bottom to merely receive the placement of the locking member 414 and the locking pillars 416 of the case 41. A trap 421 usually in the form of a piece of filtration cotton or paper is provided to the peripheral of the air cleaner element 42. A resilient washer is mounted to the lower circumference of the air cleaner element 42 and a locking hole 423 is provided on top of the air cleaner element 42 at where in relation to the locking pillar 416.

The rectangular cover 43 properly covers up the case 41 and a through hole 431 is provided on top of the cover 43 at where in relation to the locking pillar 416 to permit the insertion of a fastener 44 for locking purpose.

Figure 5:
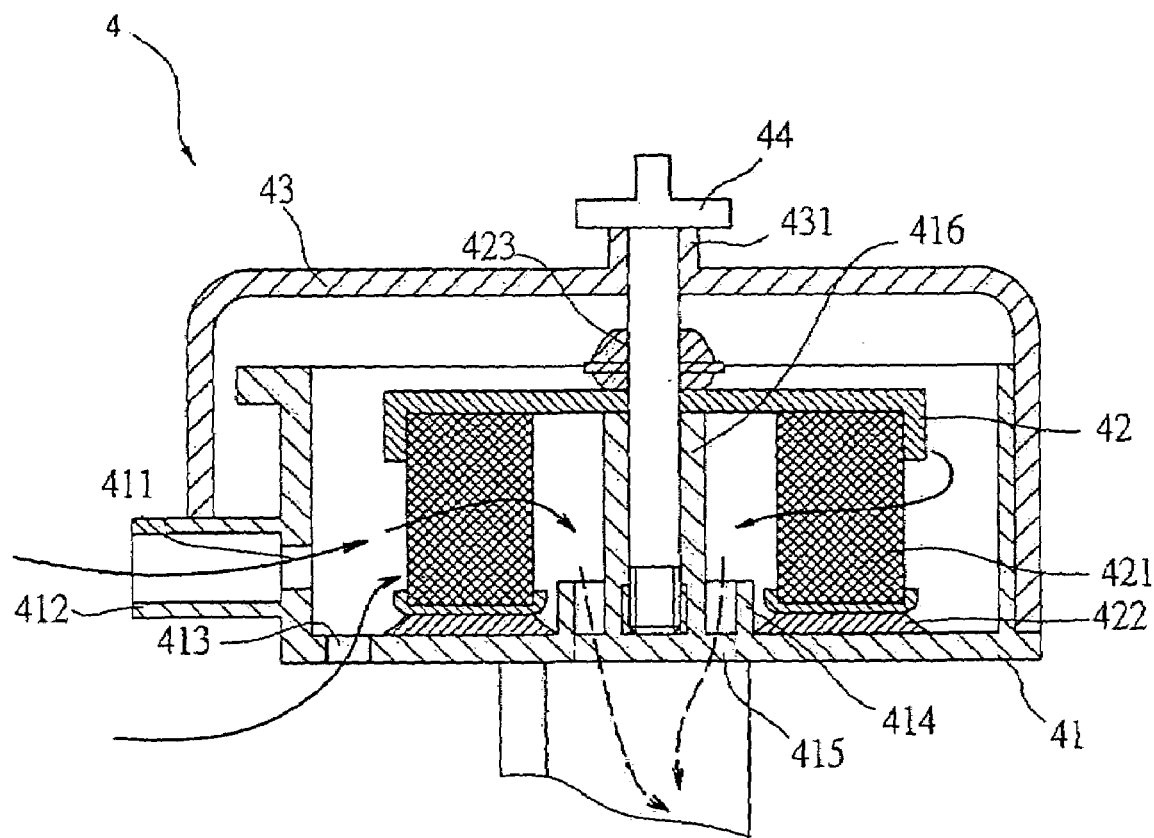
FIG. 5 is a sectional view showing a local part of the air cleaner of the present invention.

As illustrated in FIG. 5, upon assembling the air cleaner 4 of the present invention, the air cleaner is mounted to the locking member 414 inside the case 41; the locking hole 423 on top of the air cleaner element 42 is disposed at where in relation to the locking pillar 46 while the resilient washer 422 below the air cleaner element 42 is flushed on the case 41 to avoid overflow of the clean air; the cover 43 is placed on the case 41 with the through hole 431 on top of the cover 43 located at where in relation to the locking hole 423 of the air cleaner element 42; and the case 41 is secured to the locking post 416 with the fastener 44 inserted through the locking hole 423 of the air cleaner element 42 via the through hole 431.

When the engine 61 is operating as illustrated in FIGS. 5 and 6, the ambient air enters into the case 41 through the air inlet 411 and the supplementary air inlet 413 from the hollow tube 412 extending externally from the peripheral of the air inlet 411 of the case 41. Vapors and foreign matters carried by the air are filtered through the trap 421 of the air cleaner element 42 for the vapors to condensate into drops to be drained out of the case 41 through the supplementary air inlet 413 that functions also as drainage. As illustrated in FIGS. 4 and 6, the clean air passing through the trap 421 enters into the air passage 417 through the air outlet 415 of the case 41 to be mixed with the fuel at the carburetor 5, thus to keep the engine 61 running.

Now referring to FIGS. 4 and 6, when the present invention is used in a power mower, weeds, dust, and chisels ejected during the mowing are stopped from entering into the air cleaner 4 by the fender 418 provided on the side of the air passage 417 below the case 41. As stopped by the fender 418, weeds, dust, and chisels are prevented from an easy ingression into the air inlet 411, and in turn, the air inlet 411 is protected from being blocked. The fender 418 shields the carburetor 5 to prevent from being contaminated by weeds, dust, and chisels. Furthermore, when those weeds, dust, and chisels attempt to enter together with the air into the air cleaner 4, they are stopped by the hollow tube 412 of the case 41, thus to maintain normal operation of the engine.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An air cleaner for an engine of a mower comprising a case, a cover mounted on said case, and an air cleaner element accommodated in a space defined by said case and said cover; wherein at least an air inlet is provided on one side of said case, a hollow tube extending from said side of said case and communicating with said air inlet, a supplementary air inlet provided at a bottom of said case to admit air and to function as a drain, a locking member provided on said case and having a bottom provided with an air outlet, said air cleaner element being mounted on said locking member, an air passage provided below said case, a hollow tube integrally formed with said bottom of said case and communicating with said air passage, a fender provided by said air passage below said case, said locking member being provided with two locking posts going upwardly through said air cleaner element to engage with two fasteners thereby keeping said air cleaner element and said cover in place.

2. The air cleaner for an engine of a mower as claimed in claim 1, wherein said locking member extends upwardly from a center of said case.

* * * * *